(12) United States Patent
Kruse et al.

(10) Patent No.: US 10,496,485 B2
(45) Date of Patent: *Dec. 3, 2019

(54) SAFE DATA ACCESS FOLLOWING STORAGE FAILURE

(71) Applicant: Microsoft Technology Licensing, LLC, Redmond, WA (US)

(72) Inventors: David Kruse, Kirkland, WA (US); Vladimir Petter, Bellevue, WA (US); Lokesh Srinivas Koppolu, Redmond, WA (US); David Dion, Bothell, WA (US); Mathew George, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/414,817

(22) Filed: Jan. 25, 2017

(65) Prior Publication Data

US 2017/0132066 A1 May 11, 2017

Related U.S. Application Data

(63) Continuation of application No. 14/454,415, filed on Aug. 7, 2014, now Pat. No. 9,665,432.

(51) Int. Cl.
*G06F 11/14* (2006.01)
*H04L 29/06* (2006.01)
*G06F 11/07* (2006.01)

(52) U.S. Cl.
CPC ...... *G06F 11/1438* (2013.01); *G06F 11/0727* (2013.01); *G06F 11/0751* (2013.01);
(Continued)

(58) Field of Classification Search
CPC combination set(s) only.
See application file for complete search history.

(56) References Cited

U.S. PATENT DOCUMENTS 5,526,492 A 6/1996 Ishida
6,178,529 B1 1/2001 Short et al.
(Continued)

FOREIGN PATENT DOCUMENTS

JP H04271454 A 9/1992
JP H06301655 A 10/1994
(Continued)

OTHER PUBLICATIONS

European Notice of Allowance in Application 15751183.3, dated Jan. 25, 2018, 7 pages. (MS# 355129-EP-EPT).
(Continued)

*Primary Examiner* — Amine Riad

(57) ABSTRACT

A request identifier is employed with various systems and methods in order to enable an application to pause execution during a failure and subsequently resume execution and communication with a storage system once the failure is resolved. An application residing on a node may attempt to access target data on a storage system. The application sends a request to access the target data. The request may be associated with a request identifier that identifies the application. When the storage system experiences a failure, the application receives a failure notification. The application pauses execution as a result of the notification. When the node reestablishes a connection to the storage system, the application resumes execution using the same request identifier. If the resume request is granted, the application is guaranteed that the target data was not modified during the failure.

20 Claims, 8 Drawing Sheets

(52) U.S. Cl.
CPC ...... *G06F 11/0772* (2013.01); *G06F 11/0793* (2013.01); *G06F 11/1443* (2013.01); *G06F 11/1479* (2013.01); *H04L 67/42* (2013.01)

(56) References Cited

U.S. PATENT DOCUMENTS

| | | |
|---|---|---|
| 6,301,676 B1 | 10/2001 | Kumar |
| 6,539,446 B1 | 3/2003 | Chan |
| 6,564,229 B1* | 5/2003 | Baweja ............ G06F 17/30067 707/741 |
| 6,574,749 B1 | 6/2003 | Parsons |
| 7,254,687 B1 | 8/2007 | Jeter, Jr. |
| 7,284,151 B2 | 10/2007 | Chandrasekaran |
| 7,436,728 B2 | 10/2008 | Harrand |
| 7,962,915 B2 | 6/2011 | Eshel |
| 8,180,747 B2 | 5/2012 | Marinkovic et al. |
| 8,355,713 B1 | 1/2013 | Oh |
| 8,453,142 B2 | 5/2013 | Ibrahim |
| 8,458,500 B2 | 6/2013 | Akers et al. |
| 8,490,092 B2 | 7/2013 | Reuther et al. |
| 8,543,781 B2 | 9/2013 | Rawat et al. |
| 8,566,640 B2 | 10/2013 | Timashev et al. |
| 8,572,612 B2 | 10/2013 | Kern |
| 8,661,131 B1 | 2/2014 | Yemini et al. |
| 9,202,591 B2 | 12/2015 | Solhusvik |
| 9,355,060 B1 | 5/2016 | Barber et al. |
| 9,658,983 B1 | 5/2017 | Barber et al. |
| 9,665,432 B2 | 5/2017 | Kruse et al. |
| 1,229,091 A1 | 6/2017 | Kate |
| 9,727,522 B1 | 8/2017 | Barber et al. |
| 9,928,108 B1 | 3/2018 | Wagner et al. |
| 2002/0010610 A1 | 1/2002 | Jacobs |
| 2003/0126163 A1 | 7/2003 | Kim et al. |
| 2004/0243378 A1 | 12/2004 | Schnatterly |
| 2005/0165881 A1 | 7/2005 | Brooks et al. |
| 2005/0268300 A1 | 12/2005 | Lamb et al. |
| 2006/0136929 A1 | 6/2006 | Miller et al. |
| 2006/0195508 A1 | 8/2006 | Bernardin |
| 2007/0180302 A1 | 8/2007 | Allen et al. |
| 2007/0234021 A1* | 10/2007 | Ruberg ............... G06F 13/4054 712/244 |
| 2008/0195743 A1 | 8/2008 | Brueck et al. |
| 2009/0232284 A1 | 9/2009 | Afifi |
| 2009/0234643 A1 | 9/2009 | Afifi |
| 2010/0198955 A1 | 8/2010 | Maruyama et al. |
| 2011/0314470 A1 | 12/2011 | Elyashev et al. |
| 2012/0170522 A1 | 7/2012 | Badakere Ramachandra |
| 2012/0210066 A1 | 8/2012 | Joshi et al. |
| 2012/0254515 A1* | 10/2012 | Melik-Martirosian ..................... G11C 16/14 711/103 |
| 2012/0259912 A1 | 10/2012 | Kruse et al. |
| 2012/0297249 A1 | 11/2012 | Yang et al. |
| 2012/0303654 A1 | 11/2012 | Ferris |
| 2013/0007518 A1 | 1/2013 | George et al. |
| 2013/0055261 A1 | 2/2013 | Han et al. |
| 2013/0066941 A1 | 3/2013 | Kruse et al. |
| 2013/0067095 A1 | 3/2013 | Kruse et al. |
| 2013/0097665 A1 | 4/2013 | Ikeda |
| 2013/0159487 A1 | 6/2013 | Patel et al. |
| 2013/0205085 A1* | 8/2013 | Hyun ................ G11C 16/10 711/114 |
| 2013/0326266 A1 | 12/2013 | Chen |
| 2014/0006357 A1 | 1/2014 | Davis et al. |
| 2014/0068620 A1 | 3/2014 | Factor et al. |
| 2014/0108854 A1 | 4/2014 | Antony et al. |
| 2014/0109086 A1 | 4/2014 | Mizrahi et al. |
| 2014/0149485 A1 | 5/2014 | Sharma et al. |
| 2014/0201292 A1 | 7/2014 | Savage |
| 2014/0215175 A1* | 7/2014 | Kasorla ............... G06F 13/161 711/167 |
| 2014/0365258 A1 | 12/2014 | Vestal |
| 2015/0236900 A1 | 9/2015 | Polyakov |
| 2015/0301071 A1 | 10/2015 | Dhan |
| 2016/0041882 A1 | 2/2016 | Kruse et al. |
| 2016/0050294 A1 | 2/2016 | Kruse et al. |

FOREIGN PATENT DOCUMENTS

| | | |
|---|---|---|
| JP | H10133971 A | 5/1998 |
| JP | 2000036824 A | 2/2000 |
| JP | 2003256313 A | 9/2003 |
| JP | 2007537500 A | 12/2007 |
| JP | 2013171301 A | 9/2013 |
| JP | 2014500559 A | 1/2014 |
| RU | 2208834 C2 | 7/2003 |
| RU | 2012156428 A | 6/2014 |
| WO | 0177844 A1 | 10/2001 |
| WO | 2013036697 | 3/2013 |

OTHER PUBLICATIONS

U.S. Appl. No. 14/457,842, Amendment and Response filed Jun. 23, 2017, 17 pgs.

U.S. Appl. No. 14/457,842, Notice of Allowance dated Aug. 15, 2017, 8 pgs.

Bradford, et al., "LiveWide-Area Migration of Virtual Machines Including Local Persistent StateServices", In Proceedings of the 3rd International Conference on Virtual Execution Environments, Jun. 13, 2007, 11 pages.

Knauth, et al. "Fast Virtual Machine Resume for Agile Cloud Services", In Proceedings of IEEE Third International Conference on Cloud and Green Computing, Sep. 30, 2013, pp. 127-134.

PCT 2nd Written Opinion in International Application PCT/US2015/044404, dated Aug. 17, 2016, 4 pgs.

PCT International Preliminary Report on Patentability in Application PCT/US2015/042555, dated Apr. 21, 2016, 7 pgs.

PCT International Search Report and Written Opinion in International Application PCT/US2015/042555, dated Nov. 17, 2015, 16 pgs.

PCT International Search Report and Written Opinion in International Application PCT/US2015/044404, dated Jan. 15, 2016, 17 pgs.

PCT Official Communication in Application PCT/US2015/044404, dated Jun. 16, 2016, 3 pgs.

PCT Written Opinion in International Application PCT/US2015/044404, dated Dec. 19, 2016, 6 pgs.

U.S. Appl. No. 14/454,415, Advisory Action dated Jul. 29, 2016, 3 pgs.

U.S. Appl. No. 14/454,415, Amendment and Response filed Apr. 20, 2016, 12 pgs.

U.S. Appl. No. 14/454,415, Amendment and Response filed Jul. 18, 2016, 7 pgs.

U.S. Appl. No. 14/454,415, Amendment and Response filed Sep. 19, 2016, 8 pgs.

U.S. Appl. No. 14/454,415, Notice of Allowance dated Oct. 21, 2016, 5 pgs.

U.S. Appl. No. 14/454,415, Office Action dated Jan. 21, 2016, 10 pgs.

U.S. Appl. No. 14/454,415, Office Action dated Jun. 17, 2016, 8 pgs.

U.S. Appl. No. 14/457,842, Amendment and Response filed Dec. 21, 2016, 14 pgs.

U.S. Appl. No. 14/457,842, Amendment and Response filed Jun. 24, 2016, 13 pgs.

U.S. Appl. No. 14/457,842, Office Action dated Mar. 24, 2016, 13 pgs.

U.S. Appl. No. 14/457,842, Office Action dated Sep. 23, 2016, 14 pgs.

Wen, et al., "VirtualKnotter: Online Virtual Machine Shuffling for Congestion Resolving in Virtualized Datacenter", In 32nd IEEE International Conference on Distributed Computing Systems, Jun. 18, 2012, pp. 12-21.

U.S. Appl. No. 14/457,842, Office Action dated Mar. 23, 2017, 16 pgs.

PCT International Preliminary Report on Patentability in Application PCT/US2015/044404, dated Mar. 20, 2017, 7 pgs.

(56) References Cited

OTHER PUBLICATIONS

"Non Final Office Action Issued in U.S. Appl. No. 15/831,238", dated Apr. 5, 2019, 16 Pages. (MS# 355212-US-CNT).
"Office Action Issued in Russian Patent Application No. 2017104219", dated Mar. 28, 2019, 06 Pages. (MS# 355212-RU-PCT)(W/o English Translation).
"Office Action Issued in Japan Patent Application No. 2017-503008", dated Apr. 22, 2019, 06 Pages. (MS# 355212-JP-PCT).
"Office Action Issued in European Patent Application No. 15750601.5", dated Nov. 19, 2018, 5 Pages. (Ms# 355212-EP-EPT).
"Notice of Allowance Issued in Russian Patent Application No. 2017107019", dated Jan. 29, 2019, 21 Pages. (MS# 355129-RU-PCT).
"Office Action Issued in Japanese Patent Application No. 2017-506844", dated May 31, 2019, 6 Pages.

* cited by examiner

SAFE DATA ACCESS FOLLOWING STORAGE FAILURE

CROSS-REFERENCE TO RELATED APPLICATIONS

This application is a continuation application and claims priority to U.S. patent application Ser. No. 14/454,415 (now U.S. Pat. No. 9,665,432), filed Aug. 7, 2014, entitled "SAFE DATA ACCESS FOLLOWING STORAGE FAILURE," the entire disclosure of which is hereby incorporated herein by reference.

BACKGROUND

Clustered environments, e.g., environments where workloads are distributed across multiple machines, are commonly used to provide failover and high availability of information to clients. Clustered environments allow clients to access resources via one or more nodes that are part of the environment. A clustered environment can act as a client, a server, or both. In a client cluster server, an application may reside on any of the nodes that make up the cluster. The application may issue access requests for target data that is stored by a storage system. If an error occurs during an access request, the application may experience delays that impact execution.

It is with respect to these and other considerations that examples have been made. Also, although relatively specific problems have been discussed, it should be understood that the examples should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Systems and methods are disclosed herein that enable an application to pause execution during a failure and subsequently resume execution and communication with a storage system once the failure is resolved. According to some aspects, an application residing on a node in a client cluster sends an access request to a node in a server cluster to access target data. In examples, a request identifier is used to identify the application and/or related workload requesting a resource. The request identifier may be provided with the request. When the client accesses the target data, the request identifier is stored in persistent storage and associated with the requested target data.

Before the application completes its operations on the target data, a failure may occur that causes the application to lose communication with the storage system. For example, a server in the storage system may reboot, a related file system may be dismounted, a communications link may fail, etc. In such circumstances, access requests issued by the application for target data stored by the storage system will experience delays or fail altogether. However, the stored identifier may not be deleted from persistent storage, even if the application's lock on the target data expires during the failure. During the failure, the application may receive a notification that it has lost communication with the storage system and may pause execution. Upon reestablishing communication with the storage system, the application may receive a resolution notification and attempt to resume execution. Further, the application may send a resume request to the storage system to regain access to the target data. The resume request may include, or reference, the request identifier. The request identifier permits the storage system managing the request to determine that the resume request belongs to the same application that had previously accessed the resource. Doing so allows the server to grant the application's resume request to access the target data. In the event that the target data is modified prior to the resume request, the storage system disassociates the request identifier from the target data (e.g., by deleting the stored identifier from persistent storage) so that the application may not resume its prior communication with the storage system. As a result, the application is assured that if it is able to reestablish communication using a resume request and the original request identifier, the target data has not been modified since the communication failure. Otherwise, the application is alerted that the target data has changed, and the application may make a decision whether to take other actions.

Examples may be implemented as a computer process, a computing system, or as an article of manufacture such as a computer program product or computer readable media. The computer program product may be a computer storage media readable by a computer system and encoding a computer program of instructions for executing a computer process.

BRIEF DESCRIPTION OF THE DRAWINGS

Non-limiting and non-exhaustive examples are described with reference to the following figures.

DETAILED DESCRIPTION

Figure 1:
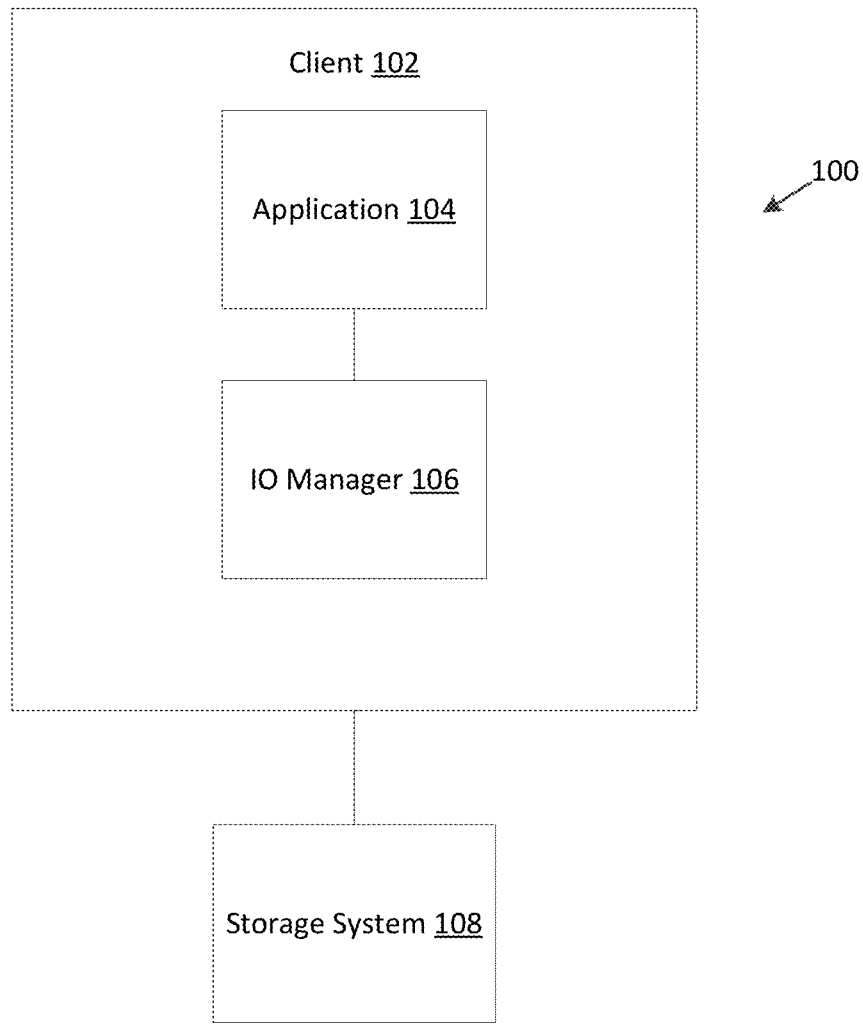
FIG. 1 illustrates a system that may be used to implement examples described herein.

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Examples of the present disclosure are related to providing applications with mechanisms to reliably access target data on a storage system and handle communication failures. In examples, a storage system may be a local device, a network-attached storage device, a distributed file server, or any other type of storage system in a computing environment. Target data may reside on a standalone server or it may reside in a clustered environment. In the examples disclosed herein, a clustered environment may include one or more nodes (e.g., client and/or server devices).

In an example, an application may request access to target data. The target data may be stored locally (e.g., on a client node), in a remote device (e.g., a remote server or a different node in the client clustered environment), or in a clustered environment (e.g., an environment containing multiple nodes) that is different from the client clustered environment. For example, in examples the clustered environment may be a client or server cluster; however, one of skill in the art will appreciate that the systems and methods disclosed herein may be employed in any other type of environment, such as, but not limited to, a virtual network.

Data may be shared among a plurality of requestors. As used herein, a requestor may comprise any application, workload, thread, or other process or entity requesting access to target data. Although examples described herein may be described with respect to an "application" or "client" or "process" or "workload" acting as a requestor, the present disclosure is not so limited. When the requestor accesses target data, the target data may be locked, thereby prohibiting other requestors from accessing it until the lock is released. Locking the target data may be employed to protect against a conflict—that is, to protect against modification of the target data by another requestor before the accessing requestor has performed its operations. Typically, when a lock is released, the storage system no longer retains any association between the target data and the requestor.

In some instances, when a failure occurs affecting the requestor's communication with the storage system, the requestor may be unable to reconnect to the storage system before the lock on the target data is released. As a result, the requestor becomes disassociated with the target data. For example, if the storage system maintains the lock using a workload instance identifier presented, or referred to, by the requestor in an access request, when the lock is released, the workload instance identifier may typically be deleted and/or disassociated from the target data. Further, because the lock was released, upon establishing a new connection, the requestor cannot assume that the target data was unmodified since it was last accessed by the requestor. Thus, rather than resuming execution and communication with the storage system, the requestor must establish a new communication session and assume that the target data is in an unknown state.

Further, when a requestor communicates with a storage system, the requestor may expect to receive no indication of communication delays or failures, and may instead assume that its contract with the storage system (and/or the input/output (IO) manager on the client hosting the requestor) guarantees access requests will be retried until they succeed. As a result, a communication failure will cause the requestor to continue waiting for a response from the storage system. This may impact the requestor's behavior and cause execution delays. For example, the requestor may be "frozen" and unable to perform any processing until the failure is resolved. The systems and methods disclosed herein provide mechanisms to identify situations where a requestor is attempting to resume communications with a storage system, as well as mechanisms to notify a requestor of communication delays or failures, thereby mitigating the impact on execution and enabling the requestor to resume execution and communication after a failure.

FIG. 1 illustrates a system 100 that may be used to implement some examples. System 100 includes a client 102 and a storage system 108. In the illustrated example, client 102 is comprised of a requestor, such as an application 104 and an input/output (IO) manager 106 hosted by a physical or virtual computing device. IO manager 106 relays and manages communications between application 104 and storage system 108. Storage system 108 stores information that is accessed by application 104. Although in FIG. 1 only application 104 on client 102 is shown communicating with storage system 108, in other examples there may be more than one application and more than one client accessing information from storage system 108. In some examples, storage system 108 may comprise storage connected locally to client 102, storage remote from client 102 accessible through a network, or storage shared among clustered file servers.

In accordance with one example, storage system 108 is utilized to provide consistent availability to application 104. This is done by utilizing components on client 102 and storage system 108 to store information that can be used to reestablish communication between client 102 and storage system 108 should there be a communication failure, a file system dismount, a reboot, or any other type of failure. As described in greater detail below, the stored information and communication failure notifications allow client 102 to have consistent file access and enable applications running on client 102 to handle communication failures that may occur. In examples, client 102 may communicate with storage system 108 using the Server Message Block (SMB) 2.0/3.0 protocol.

To illustrate one example, application 104 may indicate to IO manager 106 that communication failures during a communication session with storage system 108 should be reported. In some examples, the indication may specify a designated time period to wait for a request to succeed, after which the request should be reported as having failed. In examples, absent such indication, the application 104 may rely on IO Manager 106 to retry access requests to storage system 108. This may lead application 104 to be waiting indefinitely, with no information regarding the nature or length of the delay.

Application 104 may send an access request for target data to storage system 108. The access request for target data may include a number of file operations to perform on the target data. The operations may be, for example, opens to read/write data, enumerate attributes, lease requests to allow caching of data locally, or other file access operations. In some examples, the access request may include or refer to a request identifier, such as a workload instance identifier.

Storage system 108 receives the access request for target data. In some examples, storage system 108 may determine whether the target data is locked and therefore associated with a different request identifier, e.g., for a different requestor, such as another application running on client 102 or a different client. If the target data is locked, storage system 108 may deny the file access request, may break the lock, or may take other action depending on the protocol being employed.

Upon determining that the access request should be granted, storage system 108 sends a response to client 102 granting access to the target data. The request identifier may be stored by storage system 108 in persistent storage. When the request identifier is stored by the storage system 108, it may be referred to herein as a stored identifier. In some examples, the target data may be locked prior to, or after, granting the access request. In some examples, the lock may be configured to be released (thereby allowing other requestors to have access to the target data) upon all operations in the request being completed. Further, the lock may expire after a specified time period or upon the shorter of the specified time period and the time at which all operations in the request are completed. In still other examples, the lock may provide the client exclusive access to the target data until the client releases the lock or until an event occurs breaking the lock. For example, pursuant to the SMB protocol, an exclusive OpLock from the storage system 108 may be provided to the client 102. The client 102 may assume that it is the only process with access to the target data, and the client 102 may cache all changes to the target data before committing the changes to the storage system 108. If another client/process tries to open the same target data, the storage system 108 sends a message to the client 102 (called a break or revocation), which invalidates the exclusive OpLock previously given to the client 102. The client 102 then flushes all changes to the target data and commits them to the storage system 108.

At some point, client 102 may experience a communication failure with storage system 108. The failure may result, in some examples, from a disconnection, a dismounting of a file system, or a reboot. As a result of the communication failure, IO manager 106 provides a notification of the failure to application 104. In examples, such notification occurs only if the application 104 "opted in" and has provided an indication to the IO manager 106 that application 104 is to be notified in case of a communications failure with storage system 108. In examples, notification of the failure may include additional failure information describing the nature and/or expected length of the failure. Application 104 may use the additional failure information to determine what action to take, including continuing to wait, abandoning the particular request, retrying the request, restarting the application 104, etc. Among other options, upon receiving the notification, application 104 may pause execution. In other examples, application 104 may also (or instead) pause IO operations or related processing. In examples, the failure may also cause the storage system 108 to release the lock of application 104 on the target data; or the lock may expire during the failure.

Eventually, the failure may be resolved, and the connection between client 102 and storage system 108 may be reestablished. IO manager 106 determines whether the failure has been resolved and, if so, provides a resolution notification to application 104. In examples, application 104 may also determine whether the failure has been resolved, e.g., by retrying access requests. After receiving the resolution notification, application 104 may resume execution. In some examples where only IO operations were paused, application 104 may also resume IO operations or related processing. Application 104 sends a resume request to resume communications with storage system 108 for the target data. In examples, the resume request may be sent by or through the IO Manager 106. The resume request may comprise an access request that includes (or refers to) the request identifier used prior to the failure and may include a flag indicating to the storage system that the access request is a resume request. Storage system 108 receives the resume request. Storage system 108 determines whether the target data has changed since the failure. The determination whether target data has changed may also be made, in part, prior to receiving the resume request.

If storage system 108 determines that the target data has not changed, storage system 108 grants the resume request. In examples, the storage system 108 determines whether the target data has changed by comparing the request identifier in the resume request to the stored identifier from the most recent access request of the client for the target data. If another process or application has changed the target data between the time of the failure and the time of the resume request, the storage system 108 will have deleted the stored identifier from the most recent access request of client 102. As such, if the stored identifier matches the identifier included in, or otherwise associated with, the resume request, the storage system grants the resume request. Granting the resume request effectively guarantees to the application that the target data has not changed since the access request for which the stored identifier was originally stored. Consequently, client 102 is assured of data integrity while continuing its previous operations. For example, if client 102 had cached writes to the target data that were not completed before the failure, such writes may now be completed. If storage system 108 determines that the target data has changed (e.g., the request identifier in the resume request does not match an identifier stored in persistent storage), storage system 108 denies the resume request. As used herein, "matching" need not comprise an exact replication. Rather, matching of identifiers merely requires that an entity comparing the identifiers is sufficiently satisfied to a given level of specificity that the two identifiers refer to the same request and/or requestor.

In examples, client 102 may be hosting one or more virtual machines utilizing one or more virtual hard drives on storage system 108. When storage system 108 fails, reliability layers (such as SMB Continuous Availability) may give up on attempts to recover. This causes application 104 to receive IO failures that result in effectively "freezing" the virtual machines that have target data open on the storage system 108. Typically, virtual machines are required to go through a reboot process to handle the failure. The present disclosure, however, allows virtual machines to be paused and, once the failure is resolved, to be resumed. In this manner, an operating system reboot within the virtual machines can be avoided. In order to accomplish this, however, data integrity must be maintained.

While virtual machines are paused, all handles on the storage system 108 for that virtual machine may be closed, but the operating system state within the virtual machine may be preserved. For example, New Technology File System (NTFS) mounted on a virtual hard drive makes assumptions that on a resume of the virtual machine, all content of the virtual hard drive is the same. If the content of the virtual hard drive changes while the virtual machine is paused, the virtual hard drive may be corrupted. The present disclosure makes it possible to efficiently determine if it is same to resume a virtual machine after it was paused.

The foregoing description is merely one example of how the example shown in FIG. 1 may operate. As described in greater detail below, examples may involve different steps or operations. These may be implemented using any appropriate software or hardware component or module.

Figure 2:
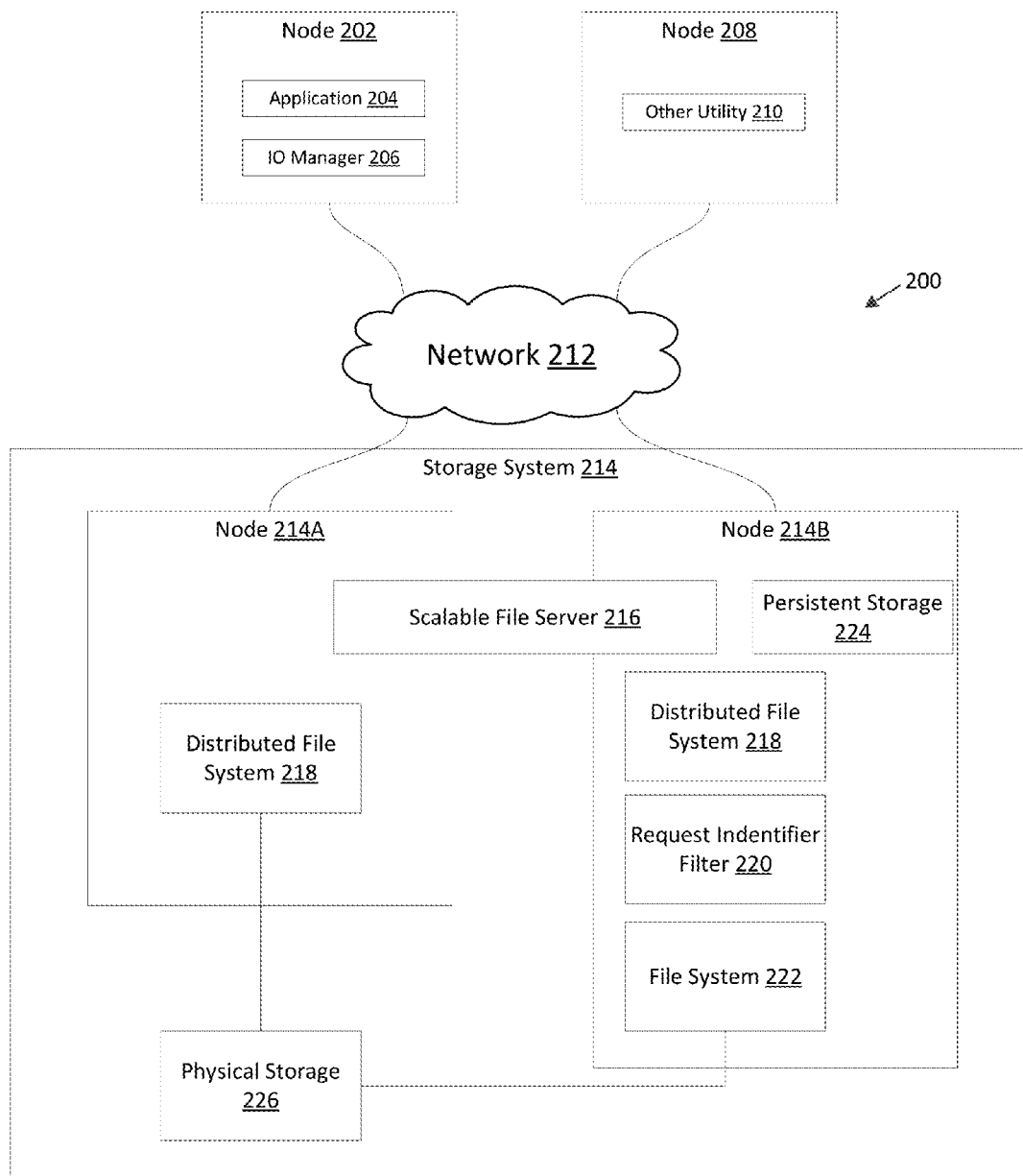
FIG. 2 illustrates a system that may be used to implement examples described herein.

FIG. 2 illustrates a system 200 that may be used to implement some examples. System 200 includes nodes 202 and 208. Node 202 is comprised of an application 204 and an IO manager 206 hosted by a physical or virtual computing device. Application 204 may be a virtualization application. Node 208 is comprised of other utility 210 and may also include one or more applications and an IO manager (not shown). Nodes 202 and 208 may be part of a client cluster of physical and/or virtual computing devices. Nodes 202 and 208 communicate with a storage system 214 through a network 212 using, for example, the SMB protocol. Storage system 214 stores information that is accessed by one or more applications on nodes 202 and 208. In examples, nodes 202 and 208 may be considered requestors, as described herein. Nodes 202 and 208 establish connections with storage system 214 to access information from scalable file server 216. Although in FIG. 2 only clients 202 and 208 are shown as communicating with storage system 214, in other examples there may be more (or fewer) than two clients accessing information from storage system 214.

As shown in FIG. 2, storage system 214 includes nodes 214A and 214B, which provide both high availability and redundancy for scalable file server 216. In examples, the storage system 214 provides a scalable file server 216 that is accessed by the clients 202 and 208. Scalable file server 216 may comprise multiple clustered servers that may cooperate to provide file information from distributed file system 218. Distributed file system 218 comprises file information that is stored on physical storage 226. File system 222 of physical storage 226 is mounted on node 214B. In some examples, the format of file system 222 may be New Technology File System (NTFS) or Resilient File System (ReFS). Node 214B acts as the coordinator of distributed file system 218 and relays file operations, e.g., read, write, and metadata operations, from distributed file system 218 to file system 222. In some examples, node 214A may perform file operations directly on physical storage 226, though node 214B may have exclusive write access such that write requests are forwarded by node 214A to node 214B rather than being directly sent to physical storage 226. Additionally, a request identifier filter 220 associates access requests with identifiers that are then stored in persistent storage 224. For example, persistent storage 224 may comprise a resume key filter database utilized by a resume key filter attached to an NTFS file system. Although two nodes are shown in FIG. 2, in other examples storage system 214 may include more than two nodes, or fewer than two nodes.

In accordance with examples, nodes 214A and 214B are utilized to provide consistent availability of scalable file server 216. This is done by utilizing components on nodes 202, 208, 214A, and 214B to store information that can be used to reestablish communication between applications on nodes 202 and 208 and scalable file server 216 on nodes 214A and 214B should there be a failure, such as a failure of network 212, a dismount of distributed file system 218 or file system 222, or a failure or reboot of one of nodes 214A and 214B. Further, application 204 may indicate to IO manager 206 that application 204 be notified of failures affecting communications with storage system 214. As described in greater detail below, the stored information and communication failure notifications allow nodes 202 and 208 to have consistent file access and enable applications running on nodes 202 and 208 to handle communication failures that may occur.

The nodes, e.g. 214A and 214B, in examples, each provide access to file data for clients and are configured to provide consistent availability of the file data to clients. To illustrate one example, application 204 may indicate to IO manager 206 that failures during a communication session with storage system 214 should be reported to the application 204. In examples, an application may have to "opt in" to receive indications of failures. In some examples, the indication may specify a time period to wait for a request to succeed, after which the request should be reported as having failed. Application 204 may send an access request for target data to node 214A. The access request may be associated with or include a request identifier, such as a workload instance identifier. For example, when a new workload is started, a tuple may be created comprising: <WorkoadPlacementId, WorkloadId, WorkloadInstanceId>. The access request for target data may include a number of file operations to perform on the target data. The operations may be, for example, opens to read/write data, enumerate attributes, lease requests to allow caching of data locally, or other file access operations. In examples, the requested target data may comprise a virtual hard drive image comprising a guest virtual machine.

Node 214A receives the access request for target data. In some examples, scalable file server 216 may determine whether the target data is locked (e.g., being accessed by a different application or process). If the target data is locked, scalable file server 108 may deny the file access request or take other action dictated by the particular protocol employed.

Upon determining that the request should be granted, node 214A sends a response to node 202 granting access to the target data. Request identifier filter 220 stores the request identifier included, or associated, with the access request from node 202 in persistent storage 224. In some examples, the target data may then be locked. The lock on the target data may eventually be released before all operations from application 204 have been completed (e.g., due to a failure), but the stored identifier may continue to be retained by persistent storage 224. Further, the lock may expire after a specified time period.

At some point, node 202 may experience a communication failure with storage system 214. The failure may result from, e.g., a disconnection, a dismounting of a file system, or a reboot. As a result of the communication failure, IO manager 206 provides a notification of the failure to application 204. Upon receiving the notification, application 204 may pause execution of one or more guest virtual machines. In addition to or in lieu of pausing guest virtual machines, application 204 may also pause IO operations or related processing.

Eventually, the connection between node 202 and storage system 214 may be restored. When IO manager 206 determines that the failure has been resolved, it provides a resolution notification to application 204. In examples, application 204 may determine that the failure has been resolved through other methods. After receiving the resolution notification, application 204 may resume execution, including resuming execution of one or more guest virtual machines. In examples, application 204 may also resume IO operations or related processing. Application 204 sends a resume request to resume communication with storage system 214 and to seek access to the target data. The resume request from application 204 includes, or is associated with, a resume request identifier that may be the same identifier used in the first access request prior to the failure. In addition, the resume request may include a flag indicating to the storage system 214 that the request is a resume request. In this example, Node 214B receives the resume request, and Node 214B determines whether the target data has changed since the failure.

If node 214B determines that the target data has not changed, node 214B grants the resume request and provides access to the target data to application 204. In some examples, and as explained further below, the determination that the target data has not changed since the previous access request of application 204 may be made by determining that the identifier included (or associated) with the resume request continues to be stored in (and has not been deleted from) persistent storage 224. When the resume request is granted, application 204 and node 214B may complete any operations that were interrupted and not completed prior to the failure. When the resume request is granted, the target data may again be locked by node 214B on behalf of application 204. Eventually, the lock on the target data may again be released (e.g., due to an additional failure, completion of operations by application 204, etc.), but the stored identifier may continue to be retained by persistent storage 224. Further, the lock may expire after a specified time period.

In some examples, Node 214B may determine that the target data has changed between the most recent access request of application 204 and the resume request. For example, at some point, other utility 210 on node 208 may alter the target data before application 204 on node 202 reestablishes its connection with storage system 214. This may occur, e.g., if application 204 had a lock on the target data as a result of its most recent access request; however, the lock expired or was released after a failure occurred, but before all operations of application 204 on the target data were completed. The termination of the lock might allow other utility 210 to alter the target data prior to the resume request being received from application 204. If the target data has changed, node 214B may remove the request identifier from persistent storage 224. In examples, the stored identifier from the most recent access request of application 204 for the target data may be deleted from persistent storage when other utility 210 alters the target data (even before the resume request occurs). For example, storage system 214 may continuously or periodically monitor changes to target data for which storage system 214 currently stores a stored identifier in persistent storage 224 and delete such stored identifiers when changes are made. In that case, the determination whether the target data has changed requires simply checking whether the identifier included (or associated) with the resume request matches the stored identifier for the target data in persistent storage 224. In examples, operations that do not constitute an alteration or change to the target data may include reading, deflating, compressing, deduplication, or snapshotting operations, and such operations on behalf of another application or other utility 210 would not result in the stored identifier of application 204 for the target data being deleted from persistent storage 224. If the target data has changed, the storage system 214 may deny the resume request, and the application may take further action. For example, if a virtual machine had been paused during the failure and a resume request after the failure is denied by storage system 214, the operating system within the virtual machine may again be paused, at which point a determination may be made to reboot the virtual machine.

As may be appreciated, the above description of system 200 is not intended to limit the examples described herein. FIG. 2 and its description are merely intended to illustrate implementation of some examples. In other examples, different types of information may be stored on different components in system 200. Thus, examples are not limited to what is shown and described in FIG. 2.

Figure 3:
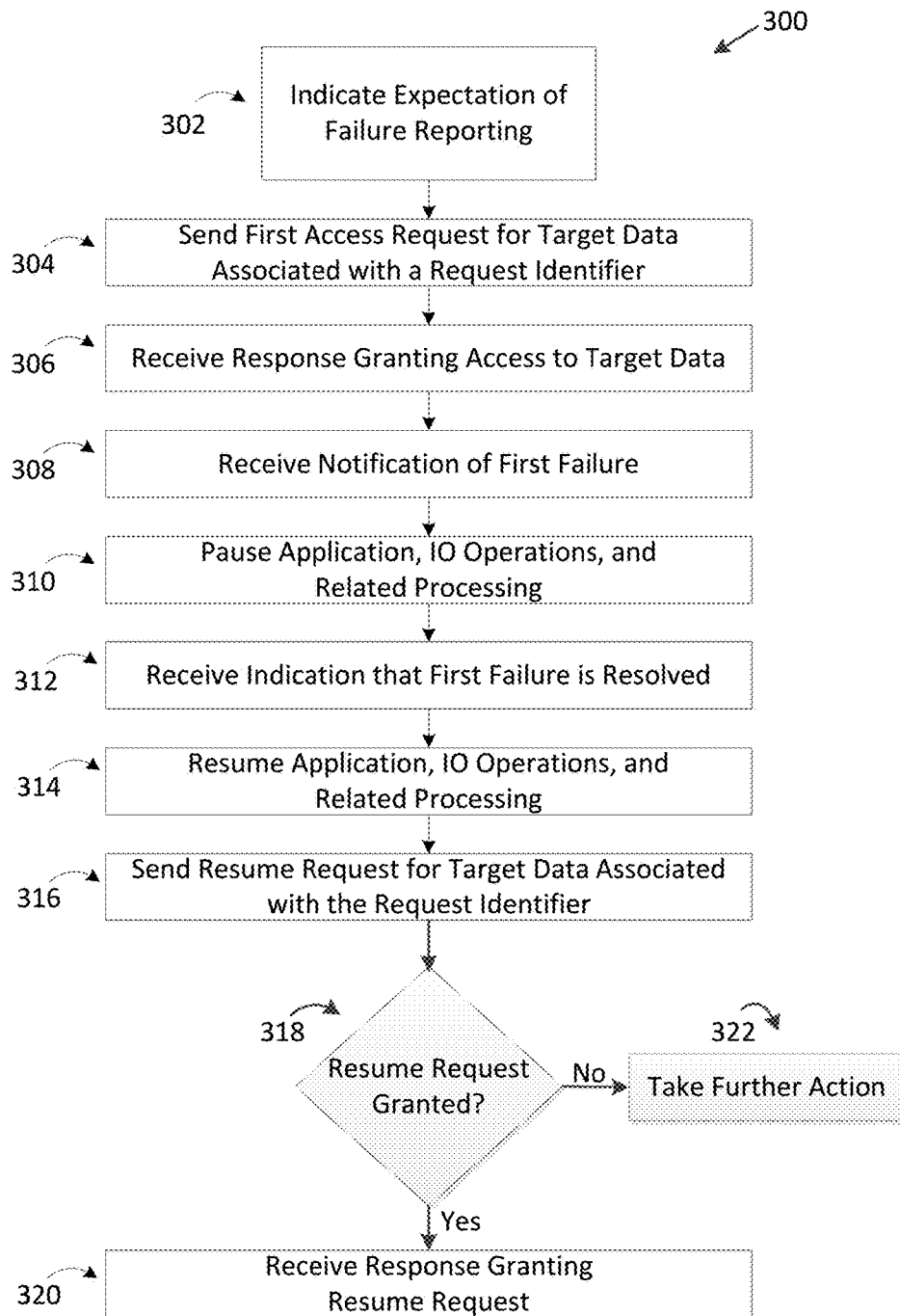
FIG. 3 is an operational flow for an application communicating with a storage system.
Figure 4:
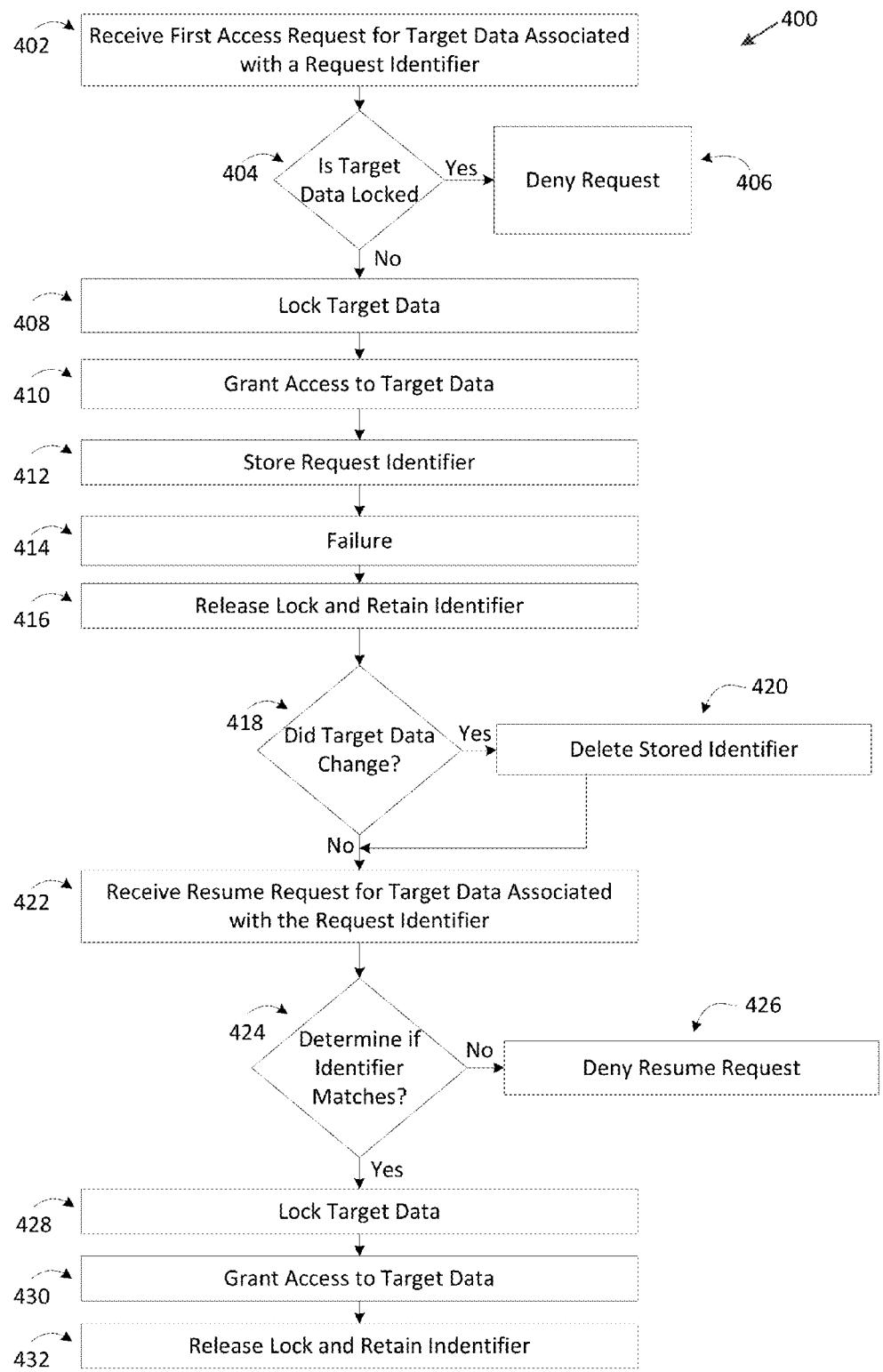
FIG. 4 is an operational flow for a storage system communicating with an application.

FIGS. 3 and 4 illustrate operational flows 300 and 400 according to examples. Operational flows 300 and 400 may be performed in any suitable computing environment. For example, the operational flows may be executed by environments such as illustrated in FIGS. 1 and 2. Therefore, the description of operational flows 300 and 400 may refer to at least one of the components of FIGS. 1 and 2. However, it is to be understood that the implementations of FIGS. 1 and 2 are non-limiting environments for operations flows 300 and 400.

Furthermore, although operational flows 300 and 400 are illustrated and described sequentially in a particular order, in other examples, the operations may be performed in different orders, multiple times, and/or in parallel. Further, one or more operations may be omitted or combined in some examples. In addition, it should be understood that ordinals such as "first" are not intended to imply an order or sequence, unless otherwise specified, and are used to distinguish between similar elements. For example, a "first access request" need not be an initial access request, but should be read to be different from a "second access request" or a "resume request."

Operational flow 300 illustrates operations for an application communicating with a storage system. In examples, flow 300 illustrated in FIG. 3 may be performed by an application that is running on a client, e.g., application 204 on node 202 (FIG. 2).

Flow 300 begins at operation 302, where an indication is communicated that storage system failures should be reported to the application. The indication may be made to an IO manager, such as IO manager 206 (FIG. 2). In some examples, the indication may specify a designated time period to wait for an access request to succeed, after which the access request should be reported as having failed.

Flow passes from operation 302 to operation 304, where a first access request for target data is sent. The first access request is associated with a first identifier. In some examples, the first identifier may be included as part of the first access request. The access request for target data may include a number of file operations to perform on the target data. The operations may be, for example, opens to read/write data, enumerate attributes, lease requests to allow caching of data locally, or other file access operations.

At operation 306, a response is received granting access to the requested target data. Moving to operation 308, a notification of first failure is received. The failure may result from, e.g., a communication failure, a file system dismount, or a reboot. Flow 300 then moves to operation 310, where, after receiving the failure notification, a determination is made to pause the application. In other examples, operation 310 may also include pausing IO operations and related processing. For example, application 204, after receiving the failure notification, may pause a guest virtual machine (FIG. 2). In some examples, the failure notification may include an indication whether the failure is expected to be resolved within a particular period of time. Such information permits the application to decide whether to pause IO operations, to reboot, or to take other action.

At operation 312, an indication is received that the first failure has been resolved. Moving to operation 314, the application is resumed. In other examples, operation 314 may also include resuming IO operations and related processing. For example, an application 204, after receiving the indication that the first failure has been resolved, may resume a guest virtual machine (FIG. 2). In examples, operation 314 may proceed without first receiving an indication that the failure has been resolved.

Flow 300 then moves to operation 316, where a resume request for target data is sent. The resume request is associated with the first identifier and includes an indication (such as a flag) that the request is a resume request. In some examples, the first identifier may be included as part of the resume request. After operation 316, flow 300 passes to operation 318, where it is determined whether the resume request was granted. If a resume request is granted, a response is received 320 granting access to the requested target data. An application receiving a response granting a resume request may consider the granting of the request as confirmation that the target data did not change between the application's most recent access request for the target data and the resume request. The application may then continue any unfinished operations on the target data. If the resume request is denied, further action is taken 322. For example, an application receiving a denial of a resume request may choose to restart. In examples, the application may also provide an indication of the failure to a user through a user interface and provide options to the user to take further action.

Operational flow 400 illustrates steps for a storage system communicating with an application. In examples, flow 400 may be performed by a storage system, such as one or more file servers, e.g., node 214A and/or node 214B (FIG. 2).

Flow 400 begins at operation 402, where a first access request for target data is received. The first access request is associated with a request identifier. In some examples, the request identifier may be included as part of the first access request. The access request for target data may include a number of file operations to perform on the target data. The operations may be, for example, opens to read/write data, enumerate attributes, lease requests to allow caching of data locally, or other file access operations. After operation 402, flow 400 passes to decision 404, where a decision is made as to whether the target data is locked.

If, at decision 404, it is determined that the target data is locked, flow passes to operation 406 where the first access request is denied. In other examples, operation 406 may comprise breaking the lock, in which case flow would proceed to operation 408.

If, at decision 404, it is determined that the target data is not locked, flow continues to operation 408 where a lock is placed on the target data for the requestor. The lock may expire after a specified time period, or may be terminated according to particular protocols. Moving to operation 410, access is granted to the requested target data. Flow then continues to operation 412, where the request identifier is stored in persistent storage.

Flow passes to operation 414, in which a failure occurs. The failure may result, e.g., from a connection interruption, a dismounting of a file system associated with the storage system, or a reboot of the storage system, etc. In examples, flow 400 includes operation 416, in which the lock created at operation 408 is released and the request identifier is retained in persistent storage. For example, a requestor may not have completed all operations on the target data prior to the failure; however, the lock is released due to expiration of a time period, due to the failure itself, or due to other factors. Flow then continues to decision 418, where a decision is made as to whether the target data was modified since it was last accessed at operation 410.

If, at decision 418, it is determined that the target data was modified, flow passes to operation 420 where the stored request identifier is removed from persistent storage. For example, if the target data was changed by another process after the lock is released in operation 416, the stored identifier associating the target data with the requestor may be deleted from persistent storage.

Flow 400 then continues (from either decision operation 418 or operation 420) to operation 422, where a resume request is received. The resume request is associated with a resume request identifier, which may be the same as the request identifier received in operation 402. In some examples, the resume request identifier may be included as part of the resume request. Further, in examples, decision 418 may occur after receiving the resume request. After operation 422, flow 400 passes to decision 424, where a determination is made whether the request identifier matches an identifier stored in persistent storage.

If, at decision 424, it is determined that the request identifier does not match, flow passes to operation 426 where the resume request is denied.

If, at decision 424, it is determined that the request identifier matches, in some examples flow continues to operation 428 where a lock is placed on the target data for the requestor. The lock may expire after a specified time period, or may be terminated according to particular protocols. Moving to operation 430, access is granted to the requested target data. In other examples, flow 400 includes operation 432, in which the lock created at operation 428 is eventually released and the request identifier is retained in persistent storage. After operation 430, or 432 in other examples, operational flow ends.

Figure 5:
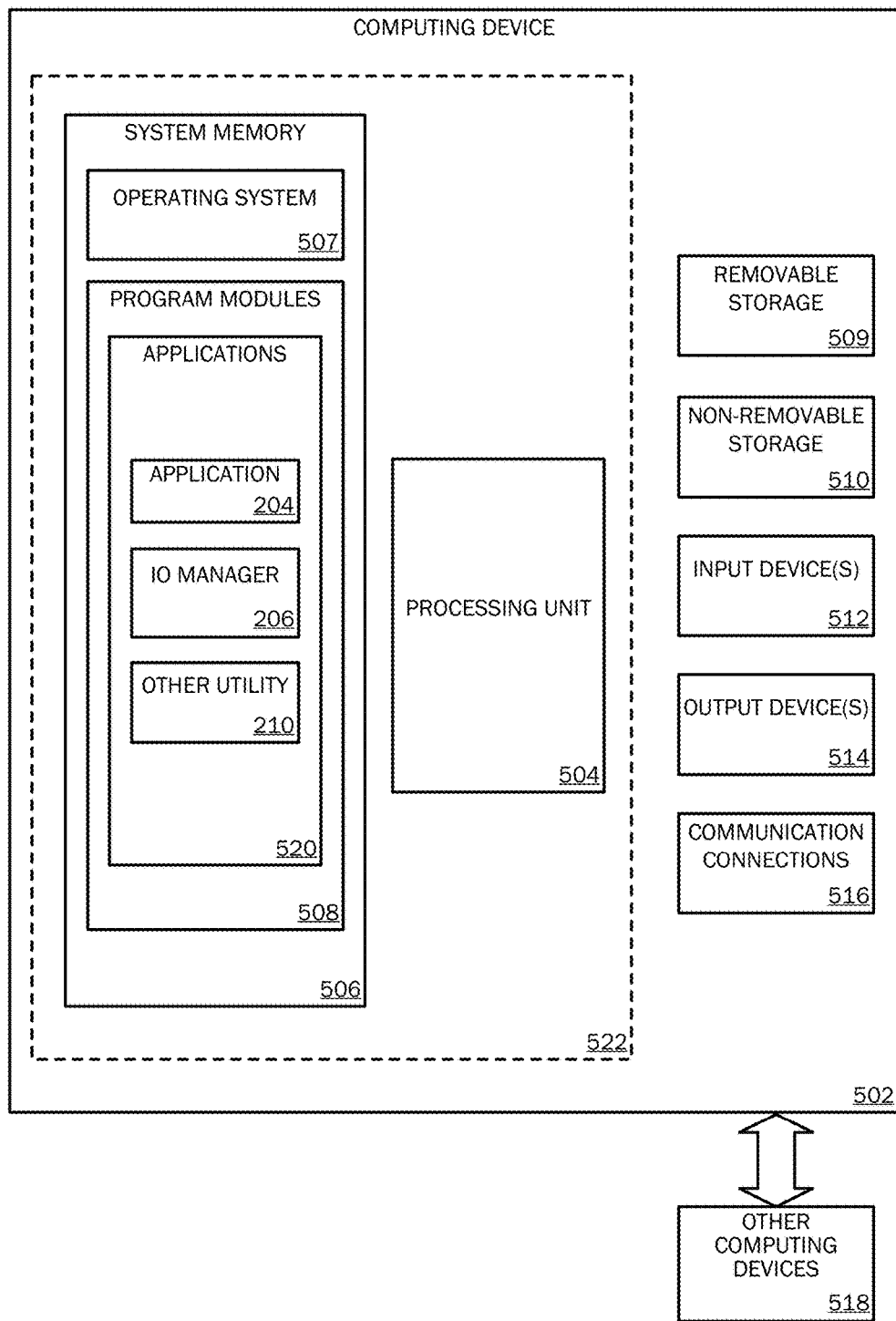
FIG. 5 is a block diagram illustrating an example of a computing device with which aspects of the invention may be practiced.
Figure 6A:
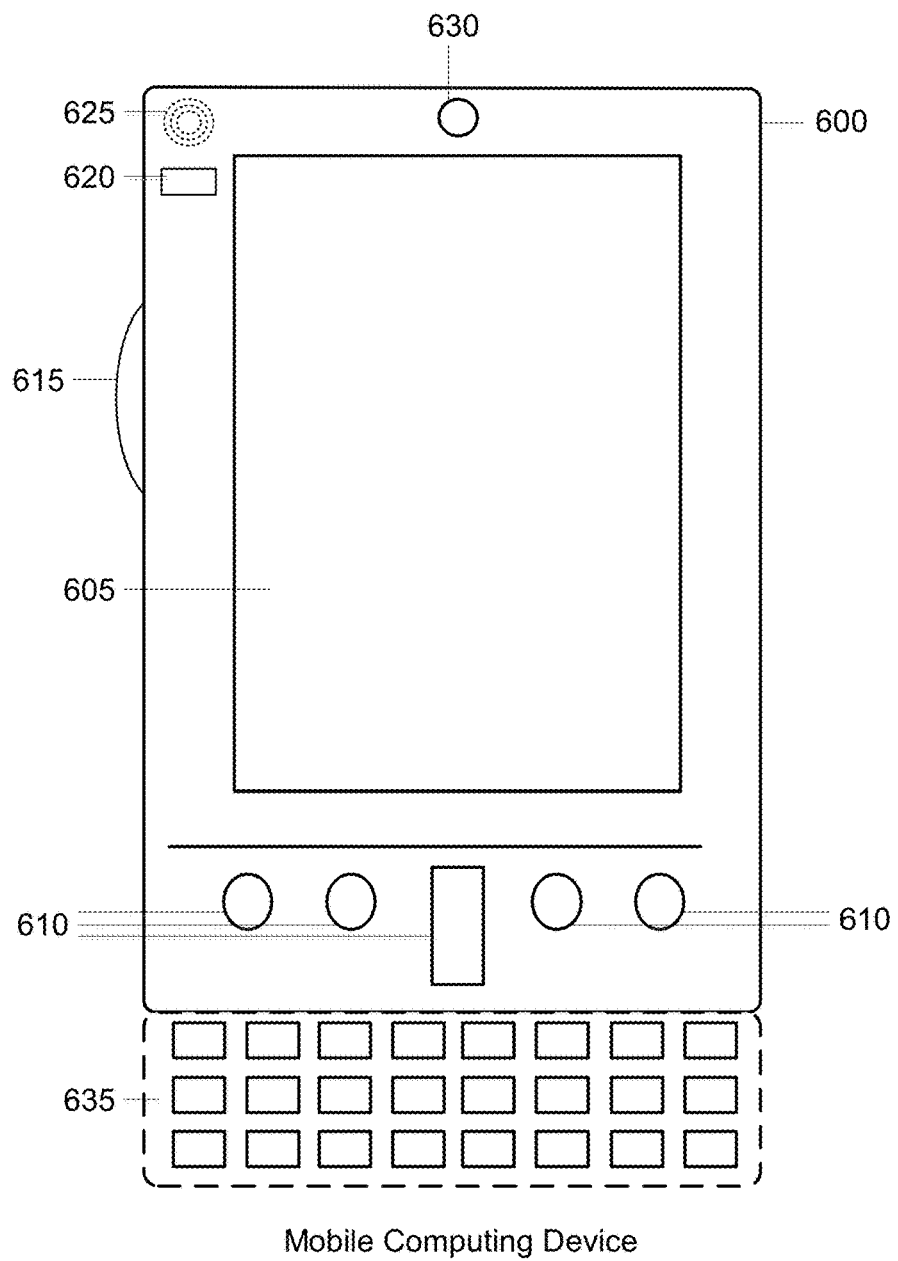
FIGS. 6A and 6B are simplified block diagrams of a mobile computing device with which aspects of the present invention may be practiced.
Figure 6B:
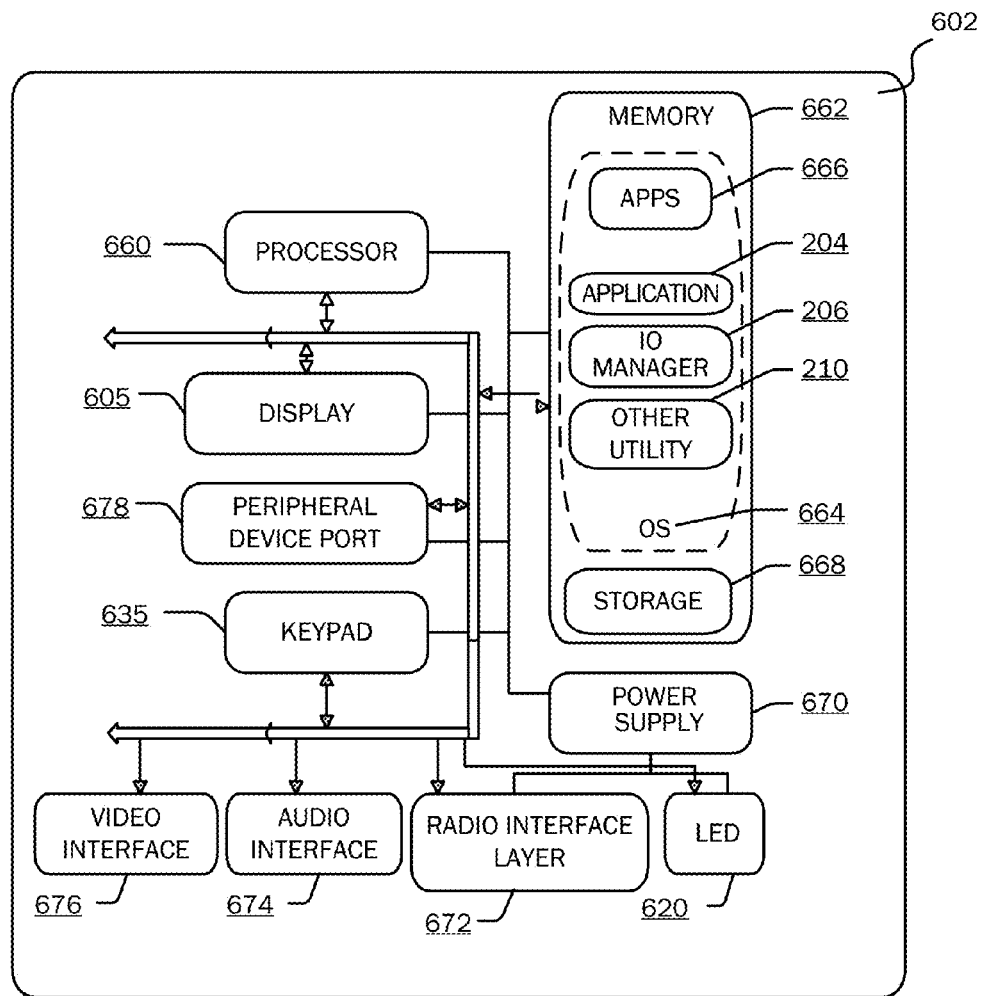
Figure 7:
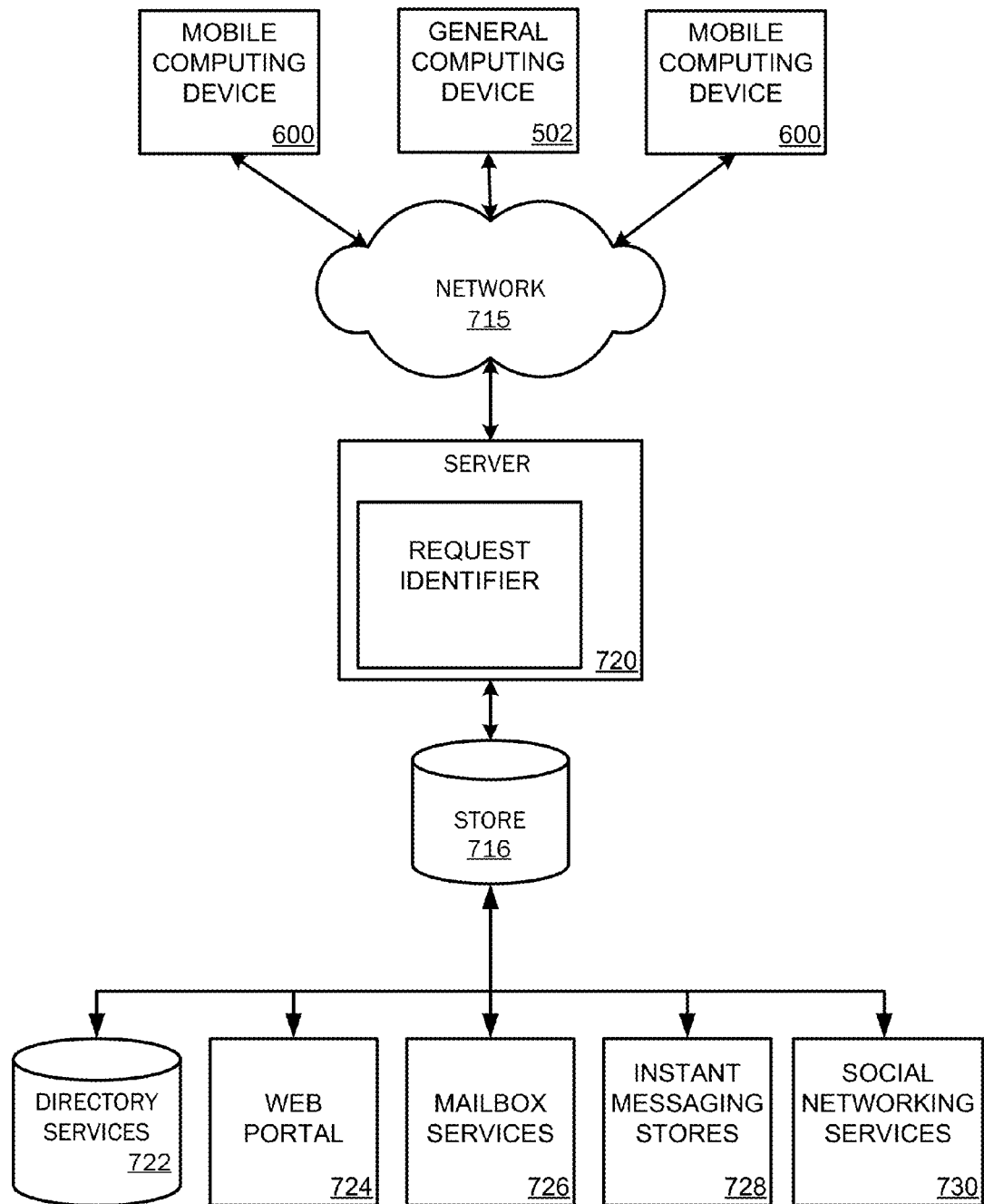
FIG. 7 is a simplified block diagram of a distributed computing system in which aspects of the present invention may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example nodes 202, 208, 214A, and 214B, with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 204, IO manager 206, and other utility 210. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 204, IO manager 206, and other utility 210) may perform processes including, but not limited to, one or more of the stages of the operational flows 300 and 400 illustrated in FIGS. 3 and 4. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples of the invention may be practiced. For example, mobile computing device 600 may be used to implement client nodes 202 and 208. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In some examples, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 204, IO manager 206, and other utility 210 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 204, IO manager 206, other utility 210, and storage system 214 may be stored in different communication channels or other storage types. For example, various documents may be stored using a directory service 722, a web portal 724, a mailbox service 726, an instant messaging store 728, or a social networking site 730. Application 204, IO manager 206, other utility 210, and storage system 214 may use any of these types of systems or the like for enabling data utilization, as described herein. A server 720 may provide storage system 214 for use by client nodes 202 and 208 operating on general computing device 502 and mobile device(s) 600 through network 715. By way of example, network 715 may comprise the Internet or any other type of local or wide area network, and the client nodes 202 and 208 may be implemented as a computing device 502 embodied in a personal computer, a tablet computing device, and/or by a mobile computing device 600 (e.g., a smart phone). Any of these embodiments of the client computing device 502 or 600 may obtain content from the store 716.

Among other examples, the present disclosure presents systems and methods for indicating, by an application, that a failure during a session should be reported to the application; sending a first access request for target data to the storage system, the first access request associated with a first identifier; receiving a first access response granting access to the target data; receiving notification of a first failure; based on the notification of the first failure, pausing the application; resuming the application; sending a resume request for the target data to the storage system, the resume request associated with the first identifier; and receiving a resume response granting access to the target data. In examples, the failure comprises at least one of: a disconnection from the storage system, a dismounting of a file system associated with the storage system, or a reboot of the storage system. In further examples, the first identifier is included in the first access request. In further examples, indicating comprises providing an indication to an input/output (IO) manager that IO requests that are delayed due to failure during the session should be reported to the application if not completed within a designated time period. In addition, receiving notification of the first failure may include receiving notification that a second access request has not been completed. Further, pausing the application may include pausing IO operations and related processing. Additionally, the systems and methods may include completing a cached write request that was not completed prior to the failure.

Further descriptions herein disclose systems and methods for receiving a first access request for target data, the target data stored by a storage system, and the first access request associated with a request identifier; storing the request identifier in persistent storage as a first stored identifier;

granting the first access request for the target data; after a failure, receiving a resume request for the target data, the resume request associated with the request identifier; determining whether the target data has changed since the failure by comparing the request identifier in the resume request to one or more identifiers in persistent storage; when the target data has not changed since the failure, granting the resume request for the target data; and when the target data has changed since the failure, denying the resume request. In examples, the storage system is a shared file system on a server cluster, and determining whether the target data has changed since the failure comprises deleting the stored first identifier from persistent storage before the resume request is received. Further, in examples, the failure comprises at least one of: a connection interruption, a dismounting of a file system associated with the storage system, or a reboot of the storage system. In additional examples, the systems and methods comprise locking the target data; and after granting the first access request, releasing the lock on the target data without deleting the first identifier from persistent storage. In addition, in examples, the lock on the target data persists for a first time period, and the first time period may be zero.

The present disclosure also includes a system including at least one processor configured to execute computer executable instructions; at least one computer readable storage media storing the computer executable instructions that, when executed by the at least one processor, provide a storage system configured to: receive a first access request for target data, the target data stored by a storage system, and the first access request including a request identifier; store the request identifier in persistent storage as a first stored identifier; grant the first access request for the target data; after a failure, receive a resume request for the target data, the resume request including the request identifier and including a resume request flag; determine whether the target data has changed since the failure by comparing the request identifier in the resume request to one or more identifiers in persistent storage; when the target data has not changed since the failure, grant the resume request for the target data; and when the target data has changed since the failure, deny the resume request. In examples, determining whether the target data has changed since the failure comprises deleting the stored first identifier from persistent storage before the resume request is received. In addition, the failure may comprise at least one of: a connection interruption, a dismounting of a file system associated with the storage system, or a reboot of the storage system. Further, the storage system may be a shared file system on a server cluster. In addition, the lock on the target data may persist for a first time period, and the first time period may be zero.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While example examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

We Claim:

1. A system comprising:
   at least one processor; and
   a memory storing instructions that when executed by the at least one processor perform a set of operations comprising:
   generating, by an application, an indication to enable failure reporting of a failure during a communication session with a storage system;
   sending a first access request for target data to the storage system, the first access request associated with a first request identifier;
   storing, by the system, the first request identifier;
   receiving a first access response granting access to the target data;
   receiving notification of a first failure;
   based on the notification of the first failure, pausing the application;
   resuming the application;
   sending a resume request for the target data to the storage system, the resume request associated with the first request identifier; and
   receiving a resume response granting access to the target data.

2. The system of claim 1, wherein the failure comprises at least one of:
   a disconnection from the storage system;
   a dismounting of a file system associated with the storage system; and
   a reboot of the storage system.

3. The system of claim 1, wherein the indication to enable failure reporting is provided to an input/output (IO) manager, and wherein access requests that are delayed due to failure during the communication session are reported to the application.

4. The system of claim 3, wherein the first failure notification is received from the IO manager, and wherein resuming the application occurs when a resume notification is received from the IO manager.

5. The system of claim 1, wherein notification of the first failure comprises additional failure information of at least one of a description of the first failure and an expected duration of the first failure.

6. The system of claim 1, wherein pausing the application includes pausing IO operations and related processing of the application.

7. The system of claim 1, wherein receiving notification of the first failure includes receiving notification that a second access request has not been completed.

8. The system of claim 1, wherein the resume request comprises a flag indicating that the resume request is a request to resume the communication session.

9. The system of claim 1, further comprising completing a cached write request that was not completed prior to the first failure.

10. A computer-implemented method, the method comprising:
- enabling failure reporting by an input/output (IO) manager of a failure during a communication session with a storage system;
- sending a first access request for target data to the storage system, the first access request associated with a first request identifier;
- storing the first request identifier;
- receiving a first access response granting access to the target data;
- receiving, from the IO manager, notification of a first failure;
- based on the notification of the first failure, pausing the application;
- resuming the application;
- sending a resume request for the target data to the storage system, the resume request associated with the first request identifier; and
- receiving a resume response granting access to the target data.

11. The computer-implemented method of claim 10, wherein the failure comprises at least one of:
- a disconnection from the storage system;
- a dismounting of a file system associated with the storage system; and
- a reboot of the storage system.

12. The computer-implemented method of claim 10, wherein notification of the first failure comprises additional failure information of at least one of a description of the first failure and an expected duration of the first failure.

13. The computer-implemented method of claim 10, wherein resuming the application occurs when a resume notification is received from the IO manager.

14. The computer-implemented method of claim 10, wherein receiving notification of the first failure includes receiving notification that a second access request has not been completed.

15. The computer-implemented method of claim 10, wherein the resume request comprises a flag indicating that the resume request is a request to resume the communication session.

16. A computer-implemented method, the method comprising:
- generating, by an application, an indication to enable failure reporting of a failure during a communication session with a storage system;
- sending a first access request for target data to the storage system, the first access request associated with a first request identifier;
- storing the first request identifier;
- receiving a first access response granting access to the target data;
- receiving notification of a first failure;
- based on the notification of the first failure, pausing the application;
- receiving notification of resolution of the first failure;
- based on the notification of resolution, resuming the application;
- sending a resume request for the target data to the storage system, the resume request associated with the first request identifier; and
- receiving a resume response granting access to the target data.

17. The computer-implemented method of claim 16, wherein the failure comprises at least one of:
- a disconnection from the storage system;
- a dismounting of a file system associated with the storage system; and
- a reboot of the storage system.

18. The computer-implemented method of claim 16, wherein the indication to enable failure reporting is provided to an input/output (IO) manager, and wherein access requests that are delayed due to failure during the communication session are reported to the application.

19. The computer-implemented method of claim 16, wherein the first failure notification is received from the IO manager, and wherein the notification of resolution is received from the IO manager.

20. The computer-implemented method of claim 16, wherein notification of the first failure comprises additional failure information of at least one of a description of the first failure and an expected duration of the first failure.

* * * * *